United States Patent
Hashimoto

(10) Patent No.: US 11,834,047 B2
(45) Date of Patent: Dec. 5, 2023

(54) TRAVELING LANE PLANNING DEVICE, STORAGE MEDIUM STORING COMPUTER PROGRAM FOR TRAVELING LANE PLANNING, AND TRAVELING LANE PLANNING METHOD

(71) Applicant: TOYOTA JIDOSHA KABUSHIKI KAISHA, Toyota (JP)

(72) Inventor: Ryuta Hashimoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 17/372,621

(22) Filed: Jul. 12, 2021

(65) Prior Publication Data
US 2022/0063627 A1    Mar. 3, 2022

(30) Foreign Application Priority Data

Aug. 31, 2020    (JP) .................................. 2020-145821

(51) Int. Cl.
*B60W 30/18* (2012.01)
*B60Q 1/34* (2006.01)

(52) U.S. Cl.
CPC ......... *B60W 30/18163* (2013.01); *B60Q 1/34* (2013.01); *B60W 2552/10* (2020.02); *B60W 2554/4041* (2020.02); *B60W 2554/4045* (2020.02)

(58) Field of Classification Search
CPC ....... B60W 30/18163; B60W 2552/10; B60W 2554/4041; B60W 2554/4045; B60W 2420/42; B60W 60/001; B60Q 1/34; B60Q 1/346
See application file for complete search history.

(56) References Cited

U.S. PATENT DOCUMENTS

| | | | |
|---|---|---|---|
| 11,597,388 B2 * | 3/2023 | Wang ................ | B60W 30/0953 |
| 2007/0142995 A1 * | 6/2007 | Wotlermann .......... | G08G 1/163 |
| | | | 701/96 |
| 2013/0085976 A1 * | 4/2013 | Bone ............... | B60W 30/18163 |
| | | | 706/46 |

(Continued)

FOREIGN PATENT DOCUMENTS

| | | |
|---|---|---|
| JP | 2015-161518 A | 9/2015 |
| WO | 2015/129365 A1 | 9/2015 |
| WO | 2019/198481 A1 | 10/2019 |

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

A traveling lane planning device has a processor configured to assess whether or not an approach zone exists on an adjacent lane between an event location and the current location of a vehicle, when the traveling lane plan includes a lane change from the traveling lane to the adjacent lane before the event location, to create a lane change plan in which the vehicle moves from the traveling lane to the adjacent lane after the vehicle has passed along the approach zone of the adjacent lane when it has assessed that the approach zone exists and to cause the vehicle to carry out a notification action which gives notice to the surrounding area of the vehicle that the vehicle will make a lane change from the traveling lane to the adjacent lane while the vehicle is traveling in the traveling lane along the approach zone of the adjacent lane.

6 Claims, 8 Drawing Sheets

(56) References Cited

U.S. PATENT DOCUMENTS

| | | | |
|---|---|---|---|
| 2014/0107867 A1* | 4/2014 | Yamashiro | G05D 1/0293 |
| | | | 701/2 |
| 2016/0347327 A1 | 12/2016 | Kondo et al. | |
| 2017/0369055 A1* | 12/2017 | Saigusa | G08G 1/161 |
| 2018/0170389 A1* | 6/2018 | Ochida | B60W 40/04 |
| 2020/0290619 A1* | 9/2020 | Mehdi | B60W 60/0011 |
| 2020/0369281 A1* | 11/2020 | Sato | B60W 30/143 |
| 2021/0148725 A1 | 5/2021 | Watahiki et al. | |
| 2021/0295703 A1* | 9/2021 | Jalali | G08G 1/096741 |
| 2021/0370978 A1* | 12/2021 | Molinari | B60W 30/18163 |
| 2021/0387632 A1* | 12/2021 | Sugawara | B60W 60/0053 |
| 2022/0082403 A1* | 3/2022 | Shapira | G01C 21/32 |
| 2022/0135039 A1* | 5/2022 | Jardine | B60W 30/18159 |
| | | | 701/26 |
| 2022/0203992 A1* | 6/2022 | Taniguchi | G08G 1/167 |
| 2022/0204047 A1* | 6/2022 | Mizoguchi | B60W 60/0059 |
| 2022/0277651 A1* | 9/2022 | Wada | G08G 1/164 |
| 2022/0306158 A1* | 9/2022 | Kiriki | B60W 30/181 |
| 2022/0348227 A1* | 11/2022 | Foster | G06V 20/58 |

\* cited by examiner

TRAVELING LANE PLANNING DEVICE, STORAGE MEDIUM STORING COMPUTER PROGRAM FOR TRAVELING LANE PLANNING, AND TRAVELING LANE PLANNING METHOD

FIELD

The present invention relates to a traveling lane planning device, a storage medium storing a computer program for traveling lane planning, and a traveling lane planning method.

BACKGROUND

An automatic control device mounted in a vehicle creates a traveling route for the vehicle based on the current location of the vehicle, the destination location of the vehicle, and a map, and controls the vehicle so that it travels along the traveling route.

When an event location such as branching, merging or a left or right turn from the traveling road on which the vehicle is currently traveling is included in a traveling route, the automatic control device controls the vehicle so that it conducts the intended operation from the event location and exits from the traveling road to a branching road at a branching location.

When the vehicle is traveling on one traffic lane (the traveling lane) on a road with two or more traffic lanes, and carries out an intended operation from an event location (for example, when it exits to a branching road at a branching location), it first makes a lane change to the traffic lane adjacent to the traveling lane (the adjacent lane). In such cases, the vehicle is controlled by the automatic control device to move from the traveling lane to the adjacent lane before the vehicle reaches the event location (see International Patent Publication No. 2019/198481, for example).

It is sometimes the case that another road (merging road) merges before the event location on the adjacent lane, creating an approach zone where other vehicles approach from the merging road to the adjacent lane. With a conventional automatic control device, in such cases the vehicle is controlled so that the lane change is made from the traveling lane to the adjacent lane to reach the event location, without awareness of the approach zone.

SUMMARY

Because other vehicles approach from the merging road within the approach zone, it can be difficult to maintain adequate inter-vehicular distance with other vehicles when traveling in the approach zone or making a lane change from the traveling lane to the approach zone of the adjacent lane. It is therefore preferable for the automatic control device to control the vehicle so that it makes the lane change to the adjacent lane after passing along the approach zone, and to then reach the event location.

It is an object of the present invention to provide a traveling lane planning device that allows a vehicle to safely make a lane change from the traveling lane to an adjacent lane even when an approach zone exists in the adjacent lane.

One embodiment of the invention provides a traveling lane planning device. The traveling lane planning device has an assessment unit that assesses whether or not an approach zone exists on an adjacent lane between an event location and the current location of a vehicle, where another vehicle may potentially enter the adjacent lane from a different traffic lane from the traveling lane, based on map information and a traveling lane plan representing a scheduled traveling lane on which the vehicle is traveling within the road, when the traveling lane plan includes a lane change of the vehicle from the traveling lane in which the vehicle is traveling to the adjacent lane before the event location on the adjacent lane, a lane change planning unit that creates a lane change plan in which the vehicle moves from the traveling lane to the adjacent lane after the vehicle has passed along the approach zone of the adjacent lane, when it has assessed that the approach zone exists and a notification operation controller that causes the vehicle to carry out a notification action which gives notice to the surrounding area of the vehicle that the vehicle will make a lane change from the traveling lane to the adjacent lane while the vehicle is traveling in the traveling lane along the approach zone of the adjacent lane based on the lane change plan.

In this traveling lane planning device, it is preferred that the notification operation controller causes a direction indicator to flash as the notification action when the vehicle is traveling in the traveling lane along the approach zone of the adjacent lane.

In this traveling lane planning device, it is preferred that the notification operation controller causes the vehicle to travel at the location further toward the adjacent lane side than the center in the widthwise direction that is perpendicular to the traveling direction of the vehicle in the traveling lane, as the notification action, when the vehicle is traveling in the traveling lane along the approach zone of the adjacent lane.

In this traveling lane planning device, it is preferred that the this traveling lane planning device has a zone determining unit that sets the approach zone area, either based on a merge start location where a traffic lane different from the traveling lane begins to merge with the adjacent lane, or based on a merge end location where a traffic lane different from the traveling lane has completed merging with the adjacent lane based on the map information, when it has been assessed that the approach zone exists.

According to another embodiment there is provided a computer-readable non-transitory storage medium that stores a computer program for traveling lane planning. The computer program for traveling lane planning causes a processor to assess whether or not an approach zone exists on an adjacent lane between an event location and the current location of a vehicle, where another vehicle may potentially enter the adjacent lane from a different traffic lane from the traveling lane, based on map information and a traveling lane plan representing a scheduled traveling lane on which the vehicle is traveling within the road, when the traveling lane plan includes a lane change of the vehicle from the traveling lane in which the vehicle is traveling to the adjacent lane before the event location on the adjacent lane, create a lane change plan in which the vehicle moves from the traveling lane to the adjacent lane after the vehicle has passed along the approach zone of the adjacent lane, when it has assessed that the approach zone exists and cause the vehicle to carry out a notification action which gives notice to the surrounding area of the vehicle that the vehicle will make a lane change from the traveling lane to the adjacent lane while the vehicle is traveling in the traveling lane along the approach zone of the adjacent lane based on the lane change plan.

Another embodiment of the invention provides a traveling lane planning method. In the traveling lane planning method, a traveling lane planning device executes to assess whether or not an approach zone exists on an adjacent lane between an event location and the current location of a vehicle, where another vehicle may potentially enter the adjacent lane from a different traffic lane from the traveling lane, based on map information and a traveling lane plan representing a scheduled traveling lane on which the vehicle is traveling within the road, when the traveling lane plan includes a lane change of the vehicle from the traveling lane in which the vehicle is traveling to the adjacent lane before the event location on the adjacent lane create a lane change plan in which the vehicle moves from the traveling lane to the adjacent lane after the vehicle has passed along the approach zone of the adjacent lane, when it has assessed that the approach zone exists and cause the vehicle to carry out a notification action which gives notice to the surrounding area of the vehicle that the vehicle will make a lane change from the traveling lane to the adjacent lane while the vehicle is traveling in the traveling lane along the approach zone of the adjacent lane based on the lane change plan.

The traveling lane planning device of the invention allows a vehicle to safely make a lane change from the traveling lane to an adjacent lane even when an approach zone exists in the adjacent lane.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
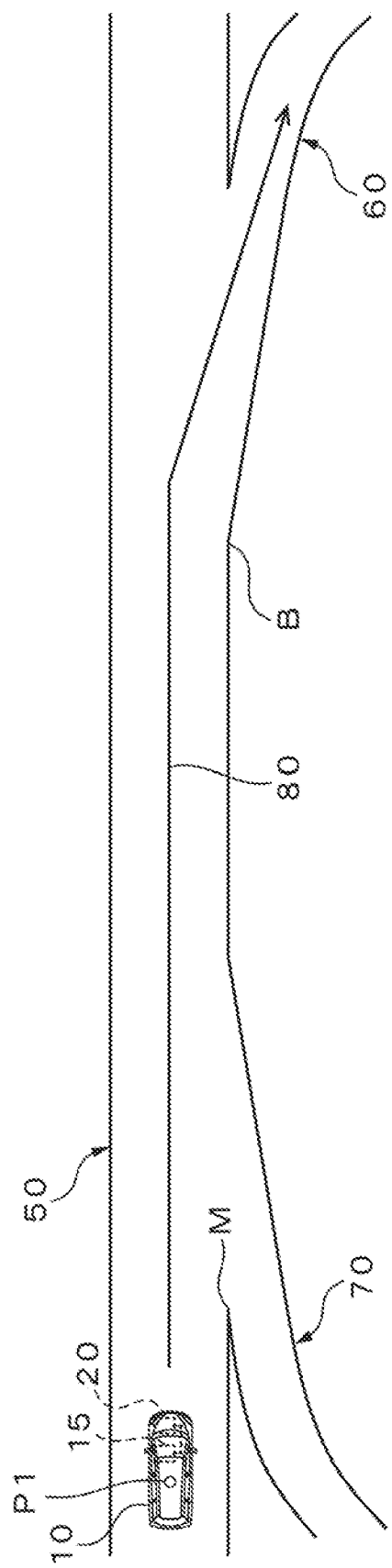
FIG. 1 is a diagram illustrating operation of the traveling lane planning device in overview (1).
Figure 2:
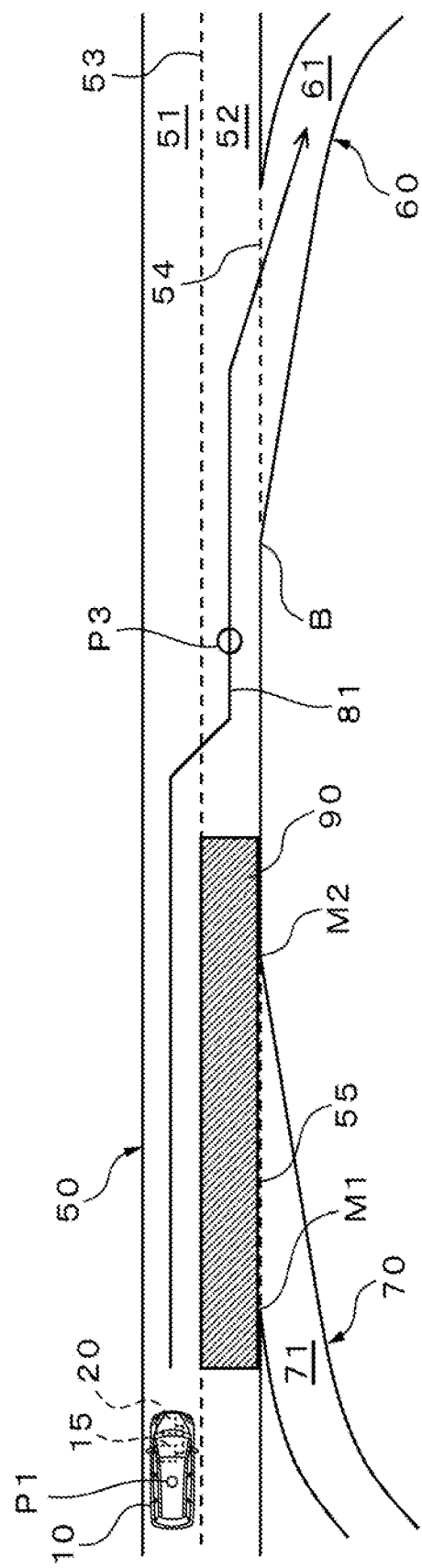
FIG. 2 is a diagram illustrating operation of the traveling lane planning device in overview (2).
Figure 3:
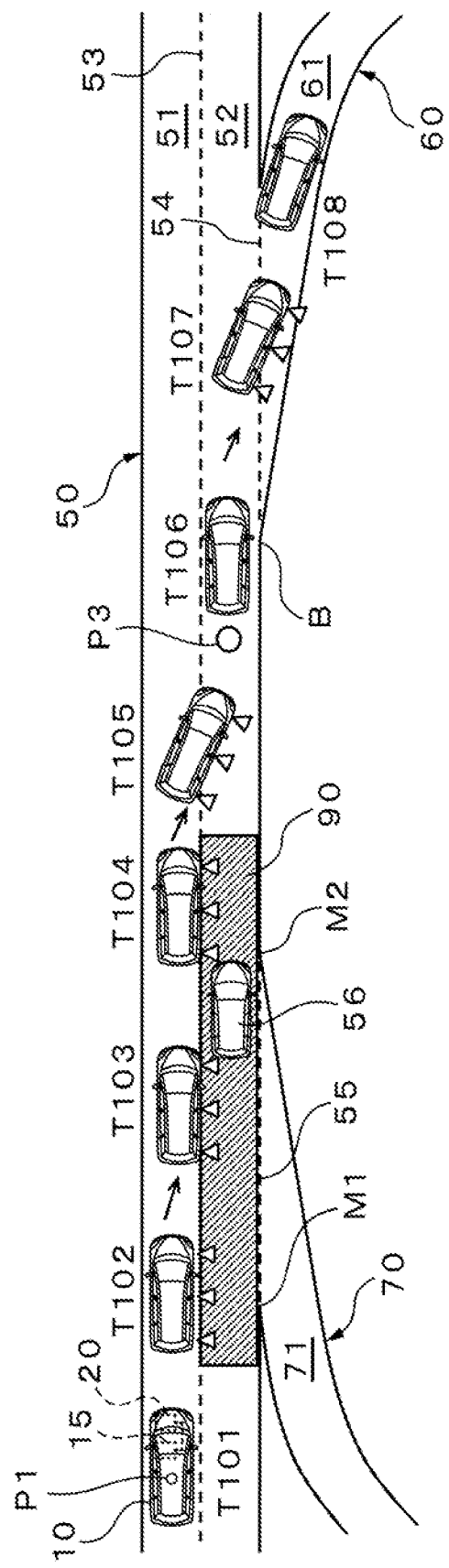
FIG. 3 is a diagram illustrating operation of the traveling lane planning device in overview (3).

FIG. 1 to FIG. 3 are diagrams illustrating operation of a traveling lane planning device in overview. Operation of the traveling lane planning device disclosed herein will now be described in overview with reference to FIG. 1 to FIG. 3. In FIG. 1 to FIG. 3, a branching location is used as an example of an event location.

FIG. 1 shows an example of a traveling route 80 generated by a navigation device 15 mounted in an automatically controlled vehicle 10. The vehicle 10 is traveling on a road 50 at the current location P1, and is expected to exit from a branching location B to a branching road 60 as the event location. Between the current location P1 of the vehicle 10 and the branching location B, a merging road 70 merges with the road 50, at a merging location M. Information relating to the traffic lane is not included in the traveling route 80.

FIG. 2 shows an example of a traveling lane plan created by a traveling lane planning device 20 mounted in the vehicle 10, for the nearest driving zone of the traveling route 80 shown in FIG. 1. The traveling lane plan shows the scheduled traveling lane on which the vehicle 10 is traveling, within the nearest driving zone. In FIG. 2, the road 50 has a traveling lane 51 on which the vehicle 10 is traveling and an adjacent lane 52 adjacent to the traveling lane 51, the traveling lane 51 and adjacent lane 52 being divided by a lane marking line 53. The branching road 60 has a single traffic lane 61, the traffic lane 61 being connected to the adjacent lane 52 through a lane marking line 54. The merging road 70 also has a single traffic lane 71, the traffic lane 71 being connected to the adjacent lane 52 through a lane marking line 55, between a merge start location M1 and a merge end location M2. The region of the adjacent lane 52 that includes the merge start location M1 and merge end location M2, where another vehicle enters from the merging road 70, is defined as the approach zone 90. Establishing of the approach zone 90 will be described below.

Since the traveling lane 51 on which the vehicle 10 is traveling is not the adjacent lane 52 that connects with the traffic lane 61 of the branching road 60, the traveling lane planning device 20 plans for the vehicle 10 to move from the traveling lane 51 to the adjacent lane 52, before the branching location B as the event location. The approach zone 90 is between the current location P1 of the vehicle 10 and the branching location B. As indicated by 81 in the drawing, the traveling lane planning device 20 creates a lane change plan by which the vehicle 10, after having passed along the approach zone 90 of the adjacent lane 52, moves from the traveling lane 51 to the adjacent lane 52, reaching the scheduled location of lane change completion P3. Thus, after the vehicle 10 has passed along the approach zone 90 of the adjacent lane 52, it moves from the traveling lane 51 to the adjacent lane 52, passing through the scheduled location of lane change completion P3 and exiting the branching road 60 as the event location (branching location B).

FIG. 3 is a diagram for the nearest driving zone of the traveling route 80 shown in FIG. 2, illustrating a notification action controlled by a notification action controller 45, when a lane change has been carried out according to the traveling lane plan created by the traveling lane planning device 20 mounted in the vehicle 10. Specifically, while the vehicle 10 is traveling in the traveling lane 51 along the approach zone 90 of the adjacent lane 52, the notification action controller 45 causes the vehicle 10 to carry out a notification action whereby the surrounding area of the vehicle 10 is notified that the vehicle 10 will make a lane change from the traveling lane 51 to the adjacent lane 52. The notification action may be flashing of a direction indicator, and causing the vehicle 10 to travel along the adjacent lane 52 side within the traveling lane 51.

As shown in FIG. 1 to FIG. 3, the traveling lane planning device 20 can maintain a safe distance between the vehicle 10 and other vehicles by preventing the vehicle 10 from traveling on the approach zone 90 of the adjacent lane 52. Before the lane change, the traveling lane planning device 20 notifies the surrounding area of the vehicle 10 that the vehicle 10 is to make a lane change from the traveling lane 51 to the adjacent lane 52, thus helping the vehicle 10 to more easily make the lane change to the adjacent lane 52 after having passed along the approach zone 90 of the adjacent lane 52. The traveling lane planning device 20 thus allows the vehicle 10 to safely make the lane change from the traveling lane 51 to the adjacent lane 52 even when an approach zone 90 exists in the adjacent lane 52.

Figure 4:
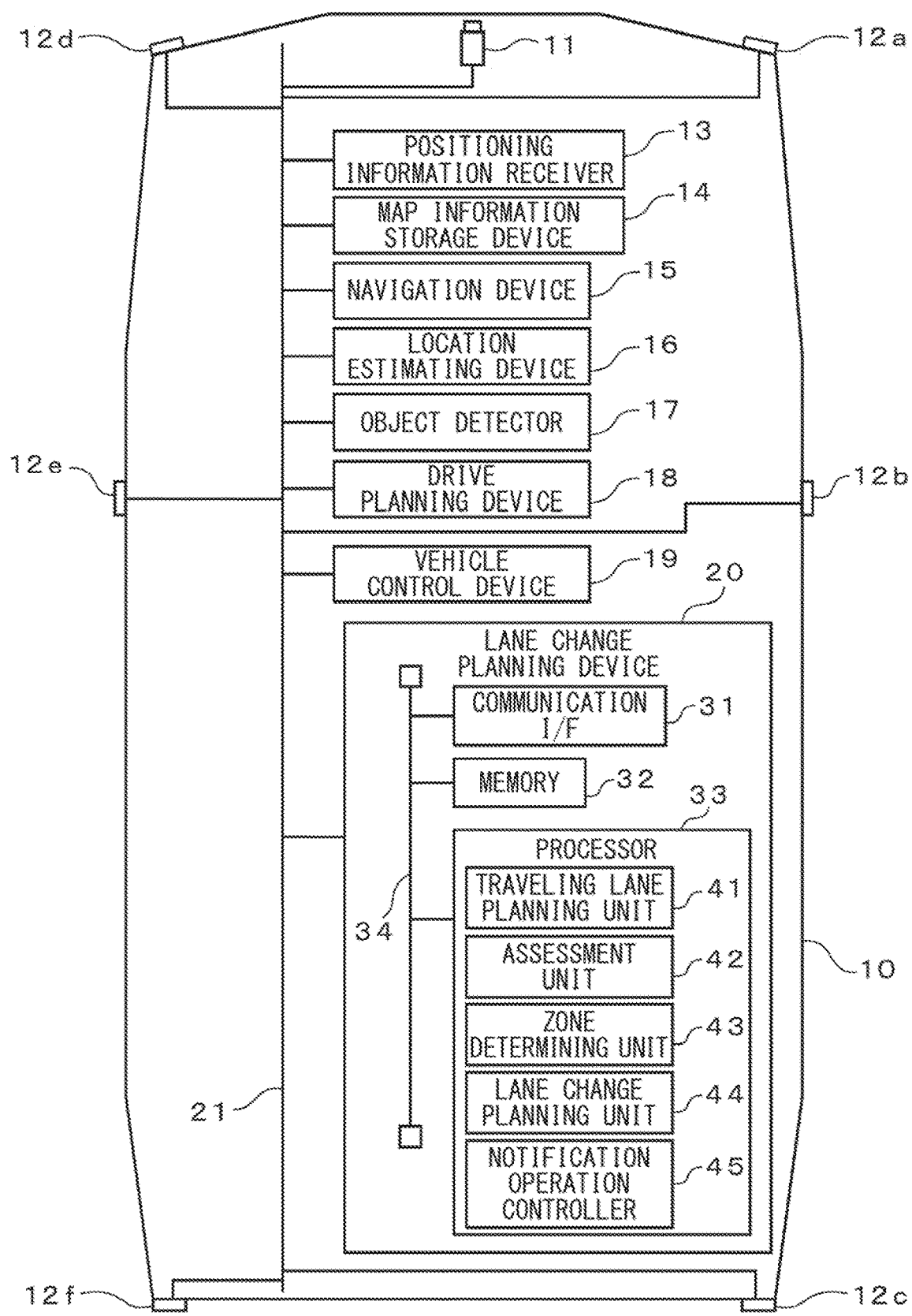
FIG. 4 is a general schematic drawing of a vehicle in which a traveling lane planning device is mounted.

FIG. 4 is a general schematic drawing of a vehicle 10 in which the traveling lane planning device 20 is mounted. The vehicle 10 has a camera 11, direction indicators 12a to 12f, a positioning information receiver 13, a map information storage device 14, a navigation device 15, a location estimating device 16, an object detector 17, a drive planning device 18, a vehicle control device 19 and a traveling lane planning device 20. The vehicle 10 may also have a sensor for obtaining probe information, such as a LiDAR sensor, serving as a distance sensor (not shown) for measurement of the distance of the vehicle 10 to surrounding objects.

The camera 11, direction indicators 12a to 12f, positioning information receiver 13, map information storage device 14, navigation device 15, location estimating device 16, object detector 17, drive planning device 18, vehicle control device 19 and traveling lane planning device 20 are connected in a communicable manner through an in-vehicle network 21 that conforms to controller area network standards.

The camera 11 is an example of an imaging unit provided in the vehicle 10. The camera 11 is mounted inside the vehicle 10 and directed toward the front of the vehicle 10. The camera 11, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 11 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 11 outputs the camera image and the camera image photograph time at which the camera image was taken, through the in-vehicle network 21 to the location estimating device 16 and object detector 17. The camera image is also used for processing at the location estimating device 16 to estimate the location of the vehicle 10. At the object detector 17, the camera image is used for processing to detect other objects surrounding the vehicle 10.

The direction indicators 12a to 12f are mounted on the outer sides of the vehicle 10, and are directed toward the right front, right side, right rear, left front, left side and left rear of the vehicle 10. The direction indicators 12a to 12f are controlled by the vehicle control device 19 or traveling lane planning device 20 to flash during a course change such as a right turn, left turn or lane change of the vehicle 10. The direction indicators 12a to 12c flash when the vehicle 10 is to make a right turn or a course change to the traffic lane on the right. The direction indicators 12d to 12f flash when the vehicle 10 is to make a left turn or a course change to the traffic lane on the left.

The positioning information receiver 13 outputs positioning information that represents the current location of the vehicle 10. The positioning information receiver 13 may be a GNSS receiver, for example. The positioning information receiver 13 outputs positioning information and the positioning information acquisition time at which the positioning information has been acquired, to the map information storage device 14 and navigation device 15, each time positioning information is acquired at a predetermined receiving cycle.

The map information storage device 14 stores wide-area map information for a relatively wide area (an area of 10 to 30 km$^2$, for example) that includes the current location of the vehicle 10. The wide-area map information preferably has high precision map information including three-dimensional information for the road surface, information for the types and locations of structures and road features such as road lane marking lines, and the legal speed limit for the road. The map information storage device 14 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 13, the map information storage device 14 refers to the stored wide-area map information and outputs map information for a relatively narrow area including the current location represented by the positioning information (for example, an area of 100 m to 10 km$^2$), through the in-vehicle network 21 to the location estimating device 16, the object detector 17 and the traveling lane planning device 20.

Based on the navigation map information, the destination location of the vehicle 10, and positioning information representing the current location of the vehicle 10 input from the positioning information receiver 13, the navigation device 15 creates a traveling route from the current location to the destination location of the vehicle 10. The traveling route includes information relating to the locations of right turns, left turns, merging and branching. When the destination location has been newly set or the current location of the vehicle 10 has exited the traveling route, the navigation device 15 creates a new traveling route for the vehicle 10. Every time a traveling route is created, the navigation device 15 outputs the traveling route to the location estimating device 16 and traveling lane planning device 20, via the in-vehicle network 21.

The location estimating device 16 estimates the location of the vehicle 10 at the camera image photograph time, based on the road features surrounding the vehicle 10 represented in the camera image. For example, the location estimating device 16 compares lane marking lines identified in the camera image with lane marking lines represented in the map information input from the map information storage device 14, and determines the estimated location and estimated declination of the vehicle 10 at the camera image photograph time. The location estimating device 16 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 16 gives notice of the information to the object detector 17, drive planning device 18, vehicle control device 19 and traveling lane planning device 20, via the in-vehicle network 21.

The object detector 17 detects other objects around the vehicle 10 and their types (for example, vehicles) based on the camera image. Other objects also include other vehicles traveling around the vehicle 10. The object detector 17 tracks other detected objects and determines the trajectories of the other objects. In addition, the object detector 17 identifies the traveling lanes in which the other objects are traveling, based on the lane marking lines represented in the map information and the locations of the objects. The object detector 17 notifies the drive planning device 18 of information representing the types of other objects that were detected, information indicating their locations, and also their traveling lanes, via the in-vehicle network 21. The object detector 17 can more accurately detect the location of other objects by using probe information from a distance sensor such as a LiDAR sensor (not shown), in combination with the camera image.

At a driving plan creation time set with a predetermined cycle, the drive planning device 18 creates a driving plan representing the scheduled traveling trajectory of the vehicle 10 up until a predetermined time (for example, 5 seconds), based on the map information, the traveling lane plan, the current location of the vehicle 10, the surrounding environment information and the vehicle status information. When notification of a lane change plan has been received from the traveling lane planning device 20, the drive planning device 18 creates a driving plan based on the lane change plan, together with the aforementioned information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. A drive planning unit 36 uses a prediction filter such as a Kalman filter to estimate future trajectories based on the most recent trajectories of other detected vehicles and, based on relative distances calculated from the traffic lanes on which the other detected vehicles are traveling, and their estimated trajectories, it creates an driving plan for the vehicle 10 so that the relative distances from the vehicle 10 to the other vehicles are at least a predetermined distance. When the lane change plan includes a lane change wherein the vehicle 10 is to move between traffic lanes, the drive planning device 18 creates a driving plan that includes the lane change, in such a manner that a predetermined distance can be maintained between the vehicle 10 and other vehicles. When the traveling lane plan includes a lane change wherein the vehicle 10 is to move between traffic lanes, but a predetermined distance cannot be ensured between the vehicle 10 and another vehicle, the drive planning device 18 creates a driving plan for traveling in the current traffic lane. The drive planning device 18 notifies the vehicle control device 19 of the driving plan for each driving plan created.

The vehicle control device 19 controls each unit of the vehicle 10 based on the location of the vehicle 10 and the vehicle speed and yaw rate, as well as on the driving plan, so that the vehicle 10 travels along the traveling route. For example, the vehicle control device 19 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 19 also outputs a control signal corresponding to a set steering amount, to an actuator (not shown) that controls the steering wheel for the vehicle 10. The vehicle control device 19 also determines the amount of fuel injection according to a set accelerator level, and outputs a control signal corresponding to the amount of fuel injection to a drive unit (not shown) of the engine of the vehicle 10. Alternatively, the vehicle control device 19 may output a control signal corresponding to a set brake level to the brake (not shown) of the vehicle 10.

All or some of the functions of the location estimating device 16, object detector 17, drive planning device 18 and vehicle control device 19 are carried out by functional modules executed by a computer program operating on a processor, for example. Alternatively, all or some of the functions of the location estimating device 16, object detector 17, drive planning device 18 and vehicle control device 19 may be carried out by specialized computing circuits. The location estimating device 16, object detector 17, drive planning device 18, vehicle control device 19 and traveling lane planning device 20 were explained above as separate devices, but all or some of them may instead be constructed in a single device.

The traveling lane planning device 20 has a communication interface (IF) 31, memory 32 and processor 33, mutually connected via a signal wire 34. Processing by the traveling lane planning device 20 will be described in specific detail below.

The communication IF 31 is an example of an in-vehicle communication unit, and it has an interface circuit to connect the traveling lane planning device 20 with the in-vehicle network 21. Specifically, the communication IF 31 is connected with the camera 11, direction indicators 12*a* to 12*f*, positioning information receiver 13, map information storage device 14, navigation device 15, location estimating device 16, object detector 17, drive planning device 18 and vehicle control device 19, via the in-vehicle network 21.

The memory 32 is an example of a memory unit, and it has a volatile semiconductor memory and a non-volatile semiconductor memory, for example. The memory 32 stores an application computer program and various data to be used for information processing carried out by the processor 33 of the traveling lane planning device 20.

The processor 33 comprises one or more CPUs (Central Processing Units) and their peripheral circuits. The processor 33 may also have other computing circuits such as a logical operation unit, numerical calculation unit or graphic processing unit. When the processor 33 has multiple CPUs, it may have a separate memory for each CPU.

The processor 33 has a traveling lane planning unit 41 that carries out traveling lane plan processing, an assessment unit 42 that carries out assessment processing, a zone determining unit 43 that carries out zone determining processing, a lane change planning unit 44 that carries out lane change plan processing, and a notification action controller 45 that carries out notification action control processing. Each of the units of the processor 33 are functional modules driven by a computer program operating on the processor 33, for example. Alternatively, each of the units of the processor 33 may be specialized computing circuits in the processor 33.

Figure 5:
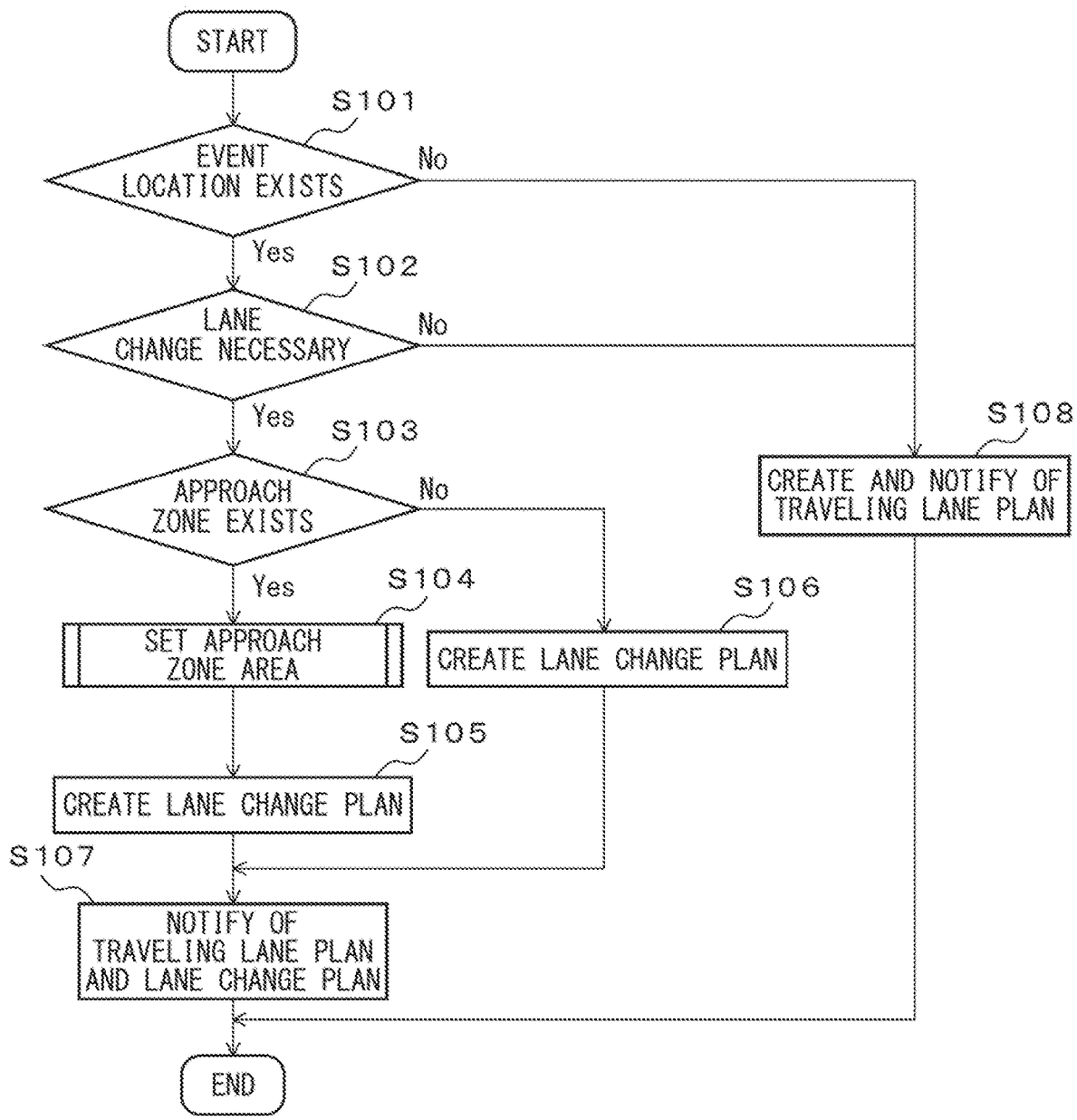
FIG. 5 is an operation flow chart for a traveling lane planning device.

FIG. 5 is an operation flow chart for a traveling lane planning device 20. Processing by the traveling lane planning device 20 will be described with reference to FIG. 5. While the vehicle 10 is traveling, the traveling lane planning device 20 carries out repeated processing according to the operation flow chart shown in FIG. 5, at a driving lane-planning creation time set within a predetermined cycle.

First, the traveling lane planning unit 41 of the processor 33 of the traveling lane planning device 20 assesses whether or not an event location exists on the traveling route in the nearest driving zone (for example, 10 km) selected from the traveling route (step S101). The event location is a branching location that branches from the traveling road on which the vehicle 10 is currently traveling, a merging location that merges from the traveling road to another road, or a location where a left or right turn is to be made from the traveling road. The event location also includes any disappearing location where the traveling lane that is currently being traveled disappears, or if the traveling road that is currently being traveled includes a priority lane (for example, a carpool lane), the merging location to the priority lane, and the branching location from the priority lane. Since a branching location B is present in the nearest driving zone in the example shown in FIG. 1, the traveling lane planning unit 41 assesses that an event location exists.

When it has been assessed that an event location exists (step S101—Yes), the traveling lane planning unit 41 assesses whether or not a lane change is necessary within the traveling road in which the vehicle 10 is currently traveling, before the branching location B as the event location. (Step S102). Based on the traveling route, the map information and the current location of the vehicle 10, the traveling lane planning unit 41 assesses whether or not the traffic lane of the traveling road (52 in the example shown in FIG. 2) connecting to the traffic lane of the branching road (61 in the example shown in FIG. 2) is the same as the traveling lane in which the vehicle 10 is currently traveling (51 in the example shown in FIG. 2). When the traffic lane of the traveling road connecting to the traffic lane of the branching road is different from the traveling lane, the traveling lane planning unit 41 assesses that a lane change is necessary within the traveling road currently being traveled by the vehicle 10, before the branching location B of the adjacent lane 52 (step S102—Yes). The traveling lane planning device 20 creates a traveling lane plan that includes the vehicle 10 traveling in the traveling lane 51, the vehicle 10 moving from the traveling lane 51 to the adjacent lane 52 before reaching the branching location, traveling on the adjacent lane 52, moving to the traffic lane 61 of the branching road 60 at the branching location, and traveling on the traffic lane 61. On the other hand, when the traffic lane of the traveling road connecting to the traffic lane of the branching road is the same as the traveling lane, the traveling lane planning unit 41 assesses that a lane change within the traveling road currently being traveled by the vehicle 10 is not necessary (step S102-No).

The assessment unit 42 of the processor 33 of the traveling lane planning device 20 then assesses whether or not an approach zone exists on the adjacent lane between the current location of the vehicle 10 and the event location, based on the map information and the traveling lane plan (step S103). In the example shown in FIG. 2, a traffic lane 71 is present which is different from the traveling lane 51, connecting with the adjacent lane 52 between the current location (P1) of the vehicle 10 and the branching location (B), and where another vehicle can potentially enter into the adjacent lane 52, and therefore the assessment unit 42 assesses that an approach zone exists (step S103—Yes).

When it has been assessed that an approach zone does not exist (step S103-No), the lane change planning unit 44 of the processor 33 of the traveling lane planning device 20 creates a lane change plan for a lane change from the traveling lane 51 to the adjacent lane 52, without considering the presence of an approach zone (step S106). In this case, the lane change planning unit 44 creates the lane change plan for a lane change to the adjacent lane 52 before a pre-established distance from the event location has been reached.

When it has been assessed that an approach zone exists, the zone determining unit 43 of the processor 33 of the traveling lane planning device 20 sets the area of the approach zone based on the map information (step S104). The details regarding assessment processing in step S104 will be described below with reference to FIG. 6 and FIG. 7.

The lane change planning unit 44 of the processor 33 of the traveling lane planning device 20 creates a lane change plan whereby the vehicle 10 moves from the traveling lane to the adjacent lane after the vehicle 10 has passed along the approach zone of the adjacent lane (step S105). In the example shown in FIG. 2, the lane change planning unit 44 sets the scheduled location of lane change completion P3 where the vehicle 10 is to move across the lane marking line 53 to the adjacent lane 52 after it has traveled on the traveling lane 51 and passed along the approach zone 90 of the adjacent lane 52. In this lane change plan, the vehicle 10 moves to the adjacent lane 52 at a location before the scheduled location of lane change completion P3 after it has traveled on the traveling lane 51 and passed along the approach zone 90 of the adjacent lane 52, and after having passed the scheduled location of lane change completion P3, it moves to the traffic lane 61 of the branching road 60. The lane change plan includes the location for moving from the traveling lane 51 to the adjacent lane 52. For example, the lane change planning unit 44 creates a lane change plan so that the vehicle 10 moves from the traveling lane 51 to the adjacent lane 52 at a location midway between the end point of the approach zone 90 and the scheduled location of lane change completion P3. The lane change plan also includes a location for moving from the adjacent lane 52 to the traffic lane 61 of the branching road 60. For example, the lane change planning unit 44 creates a lane change plan for the vehicle 10 to move from the adjacent lane 52 to the traffic lane 61 of the branching road 60, within a predetermined distance from the event location (branching location B). The method for setting the scheduled location of lane change completion P3 will be explained below with reference to FIG. 7.

The lane change planning unit 44 then notifies the drive planning device 18 and notification action controller 45 of the lane change plan created in step S105 or step S106, together with the traveling lane plan (step S107), thus completing the series of steps.

When it has been assessed that no event location exists in step S101, or even if an event location exists, when it has been assessed that no lane change is necessary in step S102, the traveling lane planning unit 41 creates a traveling lane plan which does not include the operation and lane change at the event location, and notifies the drive planning device 18 of the traveling lane plan (step S108), thus completing the series of steps. Based on the traveling route, map information, surrounding environment information and the current location of the vehicle 10, the traveling lane planning unit 41 selects a traffic lane of the road on which the vehicle 10 is traveling for the nearest driving zone, and creates a traveling lane plan representing the scheduled traveling lane, which does not include an operation or lane change at the event location. The surrounding environment information includes the locations and speeds of other vehicles traveling around the vehicle 10.

Figure 6:
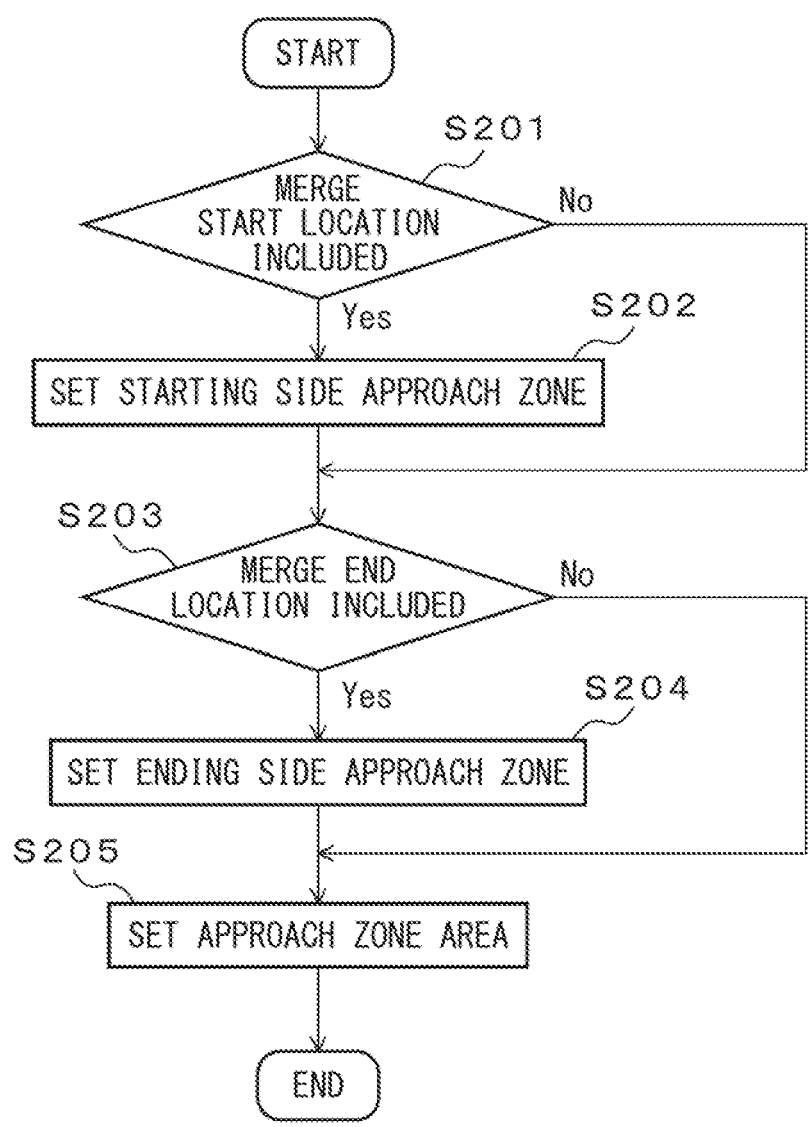
FIG. 6 is an operation flow chart for a zone determining unit.
Figure 7:
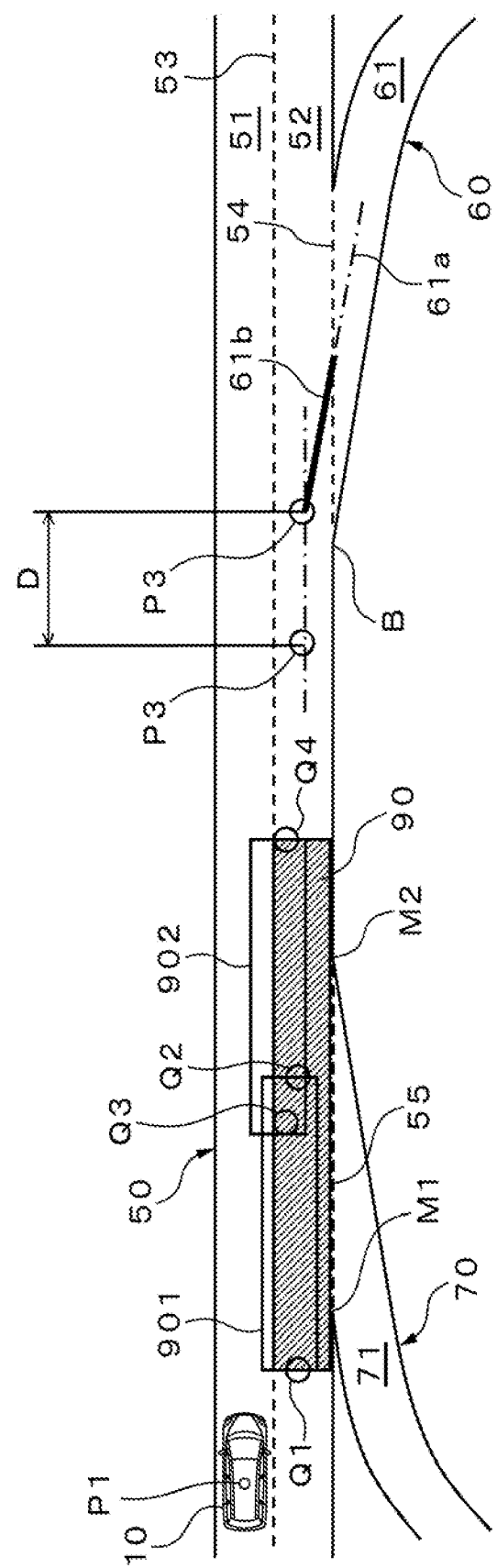
FIG. 7 is a diagram illustrating processing by a zone determining unit (1).

FIG. 6 is an operation flow chart for a zone determining unit 43. FIG. 7 is a diagram illustrating processing by a zone determining unit 43. Zone determining processing by the zone determining unit 43 in step S105 of FIG. 5 will now be explained in detail with reference to FIG. 6 and FIG. 7.

First, the zone determining unit 43 refers to the map information and assesses whether or not a merge start location where a traffic lane different from the traveling lane begins to merge with the adjacent lane is included on the adjacent lane between the current location of the vehicle 10 and the branching location, in the nearest driving zone (step S201). In the example shown in FIG. 7, the zone determining unit 43 assesses that a merge start location M1 is included in the adjacent lane between the current location P1 of the vehicle 10 and the branching location B (step S201—Yes). When it has been assessed that a merge start location is not included (step S201-No), processing by the zone determining unit 43 proceeds to step S203.

When it has been assessed that a merge start location is included, the zone determining unit 43 sets a starting side approach zone on the adjacent lane based on the merge start location (step S202). In the example shown in FIG. 7, the zone determining unit 43 sets a predetermined zone including the merge start location M1 as the starting side approach zone 901 for the adjacent lane 52. The starting side approach zone 901 is a zone where it is estimated to be difficult to maintain a safe distance between the vehicle 10 and another vehicle approaching from the traffic lane 71 of the merging road 70 toward the adjacent lane 52, when the vehicle 10 is traveling in the adjacent lane 52 or attempts to move from the traveling lane 51 of the vehicle 10 to the adjacent lane 52. In the example shown in FIG. 7, the zone determining unit 43 sets the starting side approach zone 901 to be the region between a first location Q1 of movement by a first distance from the merge start location M1 toward the current location P1 of the vehicle 10, along the adjacent lane 52, and a second location Q2 of movement by a second distance from the merge start location M1 toward the scheduled location of lane change completion P3, along the adjacent lane 52. The first distance and second distance may also be fixed reference values. The first distance and second distance may also be determined by correcting reference values based on the most recent average vehicle speed of the vehicle 10. In this case the zone determining unit 43 may correct the reference values so that the first distance and second distance are longer when the most recent vehicle speed of the vehicle 10 is faster.

Next, the zone determining unit 43 refers to the map information and assesses whether or not a merge end location where a traffic lane different from the traveling lane has completed merging with the adjacent lane is included on the adjacent lane between the current location of the vehicle 10, for the nearest driving zone (step S203). In the example shown in FIG. 7, the zone determining unit 43 assesses that a merge end location M2 is included in the adjacent lane between the current location P1 of the vehicle 10 and the branching location B, which is the event location (step S203—Yes). When it has been assessed that a merge end location is not included (step S203-No), processing by the zone determining unit 43 proceeds to step S205.

When it has been assessed that a merge end location is included, the zone determining unit 43 sets an ending side approach zone on the adjacent lane based on the merge end location (step S204). In the example shown in FIG. 7, the zone determining unit 43 sets a predetermined zone including the merge end location M2 as the ending side approach zone 902 for the adjacent lane 52. The ending side approach zone 902 is a zone where it is estimated to be difficult to maintain a safe distance between the vehicle 10 and another vehicle approaching from the traffic lane 71 of the merging road 70 toward the adjacent lane 52, when the vehicle 10 is traveling in the adjacent lane 52 or attempts to move from the traveling lane 51 of the vehicle 10 to the adjacent lane 52. In the example shown in FIG. 7, the zone determining unit 43 sets the ending side approach zone 902 to be the region between a third location Q3 of movement by a third distance from the merge end location M2 toward the current location P1 of the vehicle 10, along the adjacent lane 52, and a fourth location Q4 of movement by a fourth distance from the merge end location M2 toward the scheduled location of lane change completion P3, along the adjacent lane 52. The third distance and fourth distance may also be fixed reference values. The third distance and fourth distance may also be determined by correcting reference values based on the most recent average vehicle speed of the vehicle 10. In this case the zone determining unit 43 may correct the reference values so that the third distance and fourth distance are longer when the most recent vehicle speed of the vehicle 10 is faster.

The zone determining unit 43 then sets the approach zone area based on the starting side approach zone and/or ending side approach zone (step S205), thus completing the series of processing steps. When the starting side approach zone 901 and ending side approach zone 902 have been set as in the example of FIG. 7, the zone determining unit 43 sets the approach zone 90 area on the adjacent lane 52 so as to include the starting side approach zone 901 and ending side approach zone 902. Since a portion of the starting side approach zone 901 and ending side approach zone 902 overlap in the example of FIG. 7, the zone determining unit 43 sets the approach zone 90 area to be an area including the starting side approach zone 901 and ending side approach zone 902. The approach zone 90 area is included in the traveling lane plan.

When only the starting side approach zone is to be set, or when only the ending side approach zone is set, which may be the case, the zone determining unit 43 sets those areas to be the approach zone areas and determines information representing the approach zones. In the example shown in FIG. 7, the zone determining unit 43 considered the overlapping area of the starting side approach zone and ending side approach zone to be approach zone areas, since both the merge start location and merge end location were included within the nearest driving zone. However, even when both the merge start location and merge end location are included in the nearest driving zone, the zone determining unit 43 may establish the approach zone area based on only either one of the starting side approach zone or ending side approach zone.

The method for setting the scheduled location of lane change completion P3 will now be explained with reference to FIG. 7. The traveling lane planning unit 41 first determines an intersection P2, and sets the scheduled location of lane change completion P3 to be a location from the intersection P2 toward the current location P1 of the vehicle 10 by a predetermined distance D along the adjacent lane 52, which is also the location at the branching location B side of the event location from the approach zone 90. The intersection P2 is the point where the center line 52a of the adjacent lane 52 intersects with an extension line 61b extended from the center line 61a of the traffic lane 61 of the branching road 60 which is the destination from the event location, into the adjacent lane 52. The predetermined distance D may also be established in a manner so that the time required for the vehicle 10 to reach the intersection P2 through the scheduled location of lane change completion P3 is a predetermined time (such as 2 to 5 seconds), based on the most recent average value for the speed of the vehicle 10. The traveling lane planning unit 41 may also set the intersection P2 as the scheduled location of lane change completion P3. The midpoint between the fourth location Q4 and the intersection P2 of the approach zone 90 may also be used as the scheduled location of lane change completion P3.

The notification action when the vehicle 10 is automatically controlled based on a lane change plan for lane change of the vehicle 10 will now be explained in detail with reference to FIG. 3. First, at time T101, the vehicle 10 travels on the traffic lane 51 of the road 50. The current location P1 of the vehicle 10 is before the approach zone 90 of the adjacent lane 52.

Next, at time T102, the vehicle 10 begins traveling on the traffic lane 51 along the approach zone 90 of the adjacent lane 52. When the notification action controller 45 of the processor 33 of the traveling lane planning device 20 in the vehicle 10 has assessed that the vehicle 10 is traveling in the traveling lane 51 along the approach zone 90 of the adjacent lane 52, based on the map information and the current location of the vehicle 10, it begins flashing of the direction indicators 12a to 12c as a notification action. Flashing of the direction indicators 12a to 12c continues until the vehicle makes the change to the adjacent lane 52 (time T102 to T105).

Next, at time T103 and T104, as a further notification action, the notification action controller 45 causes the vehicle 10 to travel at a location of the traveling lane 51 that is further toward the adjacent lane 52 side than the center in the widthwise direction which is perpendicular to the traveling direction.

Next, at time T105, after having passed along the approach zone 90, the vehicle 10 moves from the traffic lane 51 to the traffic lane 52 while straddling the lane marking line 53, at a location before the scheduled location of lane change completion P3.

At time T106 to T108, after having passed the scheduled location of lane change completion P3, the vehicle 10 moves from the traffic lane 52 to the traffic lane 61 while straddling the lane marking line 54, thus exiting from the road 50 to the road 60. While the vehicle 10 is traveling in the traveling lane 51 along the approach zone 90 of the adjacent lane 52, the drive planning device 18 may estimate the future trajectory of another vehicle 56 traveling on the adjacent lane 52, based on its most recent trajectory, and may create a driving plan for the vehicle 10 to travel on the traveling lane 51 in such a manner that it does not run alongside the other vehicle 56. This will help the vehicle 10 move safely from the traveling lane 51 to the adjacent lane 52 after it has passed the approach zone 90, maintaining the predetermined distance between the other vehicle 56 and the vehicle 10.

As explained above, the traveling lane planning device creates a lane change plan, so that a lane change is made from the traveling lane in which the vehicle is traveling to the adjacent lane for branching movement of the vehicle, or when an approach zone exists in the adjacent lane, so that the vehicle moves from the traveling lane to the adjacent lane after having passed along the approach zone. In addition, while the vehicle is traveling in the traveling lane along the approach zone of the adjacent lane, the traveling lane planning device causes the vehicle to carry out a notification action whereby the surrounding area of the vehicle is notified that the vehicle will make a lane change from the traveling lane to the adjacent lane. Even when an approach zone exists in the adjacent lane, therefore, the traveling lane planning device allows other surrounding vehicles to be adequately notified before the lane change operation, also allowing adequate inter-vehicular distance to be ensured with other vehicles, so that the vehicle can make the lane change to the adjacent lane in the safest way possible.

Figure 8:
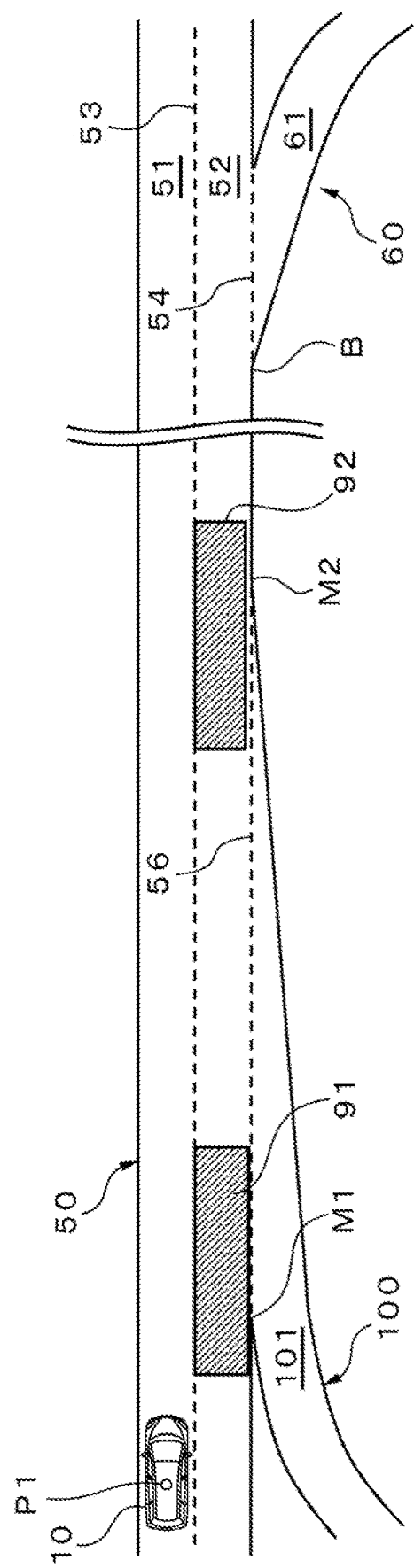
FIG. 8 is a diagram illustrating processing by a zone determining unit (2).

Another example of processing by the zone determining unit 43 will now be explained with reference to FIG. 8. FIG. 8 shows a case with adequate distance from the merge start location M1 where the traffic lane 101 of the merging road 100 begins to merge with the adjacent lane 52 via a lane marking line 56, to the merge end location M2, within approach zones 91, 92 on an adjacent lane between the event location (B) and the current location P1 of the vehicle 10, similar to FIG. 7. In the case illustrated in FIG. 8, the zone determining unit 43 sets the starting side approach zone 91 and ending side approach zone 92 as shown in FIG. 8, according to the processing flow shown in FIG. 6. Since the starting side approach zone 901 and ending side approach zone 902 were overlapping in the example of FIG. 7, the zone determining unit 43 set the approach zone 90 area to be the region from the first location Q1 to the fourth location Q4. In the example of FIG. 8, however, the starting side approach zone 91 and ending side approach zone 92 are adequately separated from each other, which allows the zone determining unit 43 to set the starting side approach zone 91 and ending side approach zone 92 as different approach zone areas. That is, the approach zone is separated into two portions, between which the vehicle 10 is permitted to make a lane change from the traveling lane 51 to the adjacent lane 52. When the region between the starting side approach zone 91 and the ending side approach zone 92 is less than a predetermined distance, the starting side approach zone 91, the ending side approach zone 92 and the zone between them may be considered to be the approach zone.

The traveling lane planning device and computer program for traveling lane planning of the aforementioned embodiments of the invention may also incorporate appropriate modifications that are still within the gist of the invention. Moreover, the technical scope of the invention is not limited to this embodiment, and includes the invention and its equivalents as laid out in the Claims.

The invention claimed is:

1. A traveling lane planning device comprising a processor configured to:
when a traveling lane plan indicates a lane change of a vehicle from a traveling lane in which the vehicle is traveling to an adjacent lane before an event location on the adjacent lane, assess whether an approach zone exists on the adjacent lane between the event location and a current location of the vehicle, based on map information and the traveling lane plan, the approach zone indicating an area where another vehicle is permitted to enter the adjacent lane from a traffic lane that is different than the traveling lane;
based on an assessment that the approach zone exists, create a lane change plan in which the vehicle moves from the traveling lane to the adjacent lane after the vehicle has passed the approach zone on the adjacent lane; and
cause the vehicle to carry out a notification action which gives notice to a surrounding area of the vehicle that the vehicle is making the lane change, based on the lane change plan, from the traveling lane to the adjacent lane while the vehicle is traveling in the traveling lane alongside the approach zone on the adjacent lane, the notification action starting when the vehicle travels beyond a start of the approach zone and ending when the vehicle completes the lane change.

2. The traveling lane planning device according to claim 1, wherein the processor is configured to cause a direction indicator to flash as the notification action when the vehicle is traveling in the traveling lane along the approach zone of the adjacent lane.

3. The traveling lane planning device according to claim 1, wherein the processor is configured to cause the vehicle to travel at a location further toward the adjacent lane side than a center in a widthwise direction that is perpendicular to a traveling direction of the vehicle in the traveling lane, as the notification action, when the vehicle is traveling in the traveling lane along the approach zone of the adjacent lane.

4. The traveling lane planning device according to claim 1, wherein the processor is configured to, based on the assessment that the approach zone exists, set, based on the map information, the approach zone based on at least one of a merge start location where the traffic lane begins to merge with the adjacent lane and a merge end location where the traffic lane has completed merging with the adjacent lane.

5. A computer-readable non-transitory storage medium that stores a computer program for traveling lane planning, and the computer program causes a processor to:
- when a traveling lane plan indicates a lane change of a vehicle from a traveling lane in which the vehicle is traveling to an adjacent lane before an event location on the adjacent lane, assess whether an approach zone exists on the adjacent lane between the event location and a current location of the vehicle, based on map information and the traveling lane plan, the approach zone indicating an area where another vehicle is permitted to enter the adjacent lane from a traffic lane that is different than the traveling lane;
- based on an assessment that the approach zone exists, create a lane change plan in which the vehicle moves from the traveling lane to the adjacent lane after the vehicle has passed the approach zone on the adjacent lane; and
- cause the vehicle to carry out a notification action which gives notice to a surrounding area of the vehicle that the vehicle is making the lane change, based on the lane change plan, from the traveling lane to the adjacent lane while the vehicle is traveling in the traveling lane alongside the approach zone on the adjacent lane, the notification action starting when the vehicle travels beyond a start of the approach zone and ending when the vehicle completes the lane change.

6. A traveling lane planning method by a traveling lane planning device, comprising:
- when a traveling lane plan indicates a lane change of a vehicle from a traveling lane in which the vehicle is traveling to an adjacent lane before an event location on the adjacent lane, assessing whether an approach zone exists on the adjacent lane between the event location and a current location of the vehicle, based on map information and the traveling lane plan, the approach zone indicating an area where another vehicle is permitted to enter the adjacent lane from a traffic lane that is different than the traveling lane;
- based on assessing that the approach zone exists, creating a lane change plan in which the vehicle moves from the traveling lane to the adjacent lane after the vehicle has passed the approach zone on the adjacent lane; and
- causing the vehicle to carry out a notification action which gives notice to a surrounding area of the vehicle that the vehicle is making the lane change, based on the lane change plan, from the traveling lane to the adjacent lane while the vehicle is traveling in the traveling lane alongside the approach zone on the adjacent lane, the notification action starting when the vehicle travels beyond a start of the approach zone and ending when the vehicle completes the lane change.

* * * * *